US011305214B2

(12) United States Patent
Norris

(10) Patent No.: US 11,305,214 B2
(45) Date of Patent: Apr. 19, 2022

(54) SUBMERSIBLE SIEVE APPARATUS FOR MINERALS

(71) Applicant: Victor Daniel Norris, Mead, CO (US)

(72) Inventor: Victor Daniel Norris, Mead, CO (US)

( * ) Notice: Subject to any disclaimer, the term of this patent is extended or adjusted under 35 U.S.C. 154(b) by 211 days.

(21) Appl. No.: 16/501,525

(22) Filed: Apr. 24, 2019

(65) Prior Publication Data
US 2019/0308119 A1    Oct. 10, 2019

Related U.S. Application Data

(60) Provisional application No. 62/764,135, filed on Jul. 19, 2018.

(51) Int. Cl.
| | | |
|---|---|---|
| *B01D 29/05* | (2006.01) | |
| *E02B 15/08* | (2006.01) | |
| *C02F 1/00* | (2006.01) | |
| *C02F 103/00* | (2006.01) | |

(52) U.S. Cl.
CPC .............. *B01D 29/05* (2013.01); *C02F 1/004* (2013.01); *E02B 15/0814* (2013.01); *C02F 2103/007* (2013.01)

(58) Field of Classification Search
CPC .... B01D 29/05; C02F 1/004; C02F 2013/007; C02F 2103/007; E02B 5/085; E02B 8/023; E02B 15/0814
USPC ........ 210/162, 170.1, 747.5; 405/21, 27, 30, 405/32, 60–72
See application file for complete search history.

(56) References Cited

U.S. PATENT DOCUMENTS

| | | | | |
|---|---|---|---|---|
| 3,702,657 | A * | 11/1972 | Cunningham | E02B 15/06 210/242.4 |
| 5,256,312 | A * | 10/1993 | Letersky | B01D 29/05 210/767 |
| 5,269,254 | A * | 12/1993 | Gagliano | A01K 61/54 119/237 |
| 5,547,313 | A * | 8/1996 | Holland | E02B 15/06 405/63 |
| 5,954,952 | A * | 9/1999 | Strawser, Sr. | E03F 1/00 210/164 |
| 6,905,289 | B1 * | 6/2005 | Sanguinetti | E02B 3/108 405/107 |
| 6,923,911 | B1 * | 8/2005 | Beier | B01D 29/012 210/273 |
| 7,157,010 | B1 * | 1/2007 | Wolfe | C02F 1/004 210/702 |
| 10,753,077 | B2 * | 8/2020 | Coppola | C02F 1/004 |
| 2005/0000865 | A1 * | 1/2005 | Schulte | B07B 1/48 209/403 |
| 2011/0283506 | A1 * | 11/2011 | Belisle | E02B 15/0814 29/428 |
| 2011/0305517 | A1 * | 12/2011 | Borries | E02B 15/08 405/63 |
| 2012/0087730 | A1 * | 4/2012 | Berger | E02B 15/06 405/63 |
| 2013/0206681 | A1 * | 8/2013 | Alexander | B01D 29/05 210/483 |

(Continued)

*Primary Examiner* — Joshua E Rodden

(57) ABSTRACT

A submersible sieve apparatus provided with an exoskeletal frame enveloping a filter element and a detached post-filter backing; positioned to strain a lotic stream of entrained sediment prior to or upon being deposited. The frame can positioned and manipulated for greater efficiency. The filter and backing will take the shape of the frame and the backing may or may not be attached.

7 Claims, 1 Drawing Sheet

(56) References Cited

U.S. PATENT DOCUMENTS

| | | | | |
|---|---|---|---|---|
| 2015/0336358 A1* | 11/2015 | Dodge | ............... | B32B 9/02 |
| | | | | 428/195.1 |
| 2017/0136392 A1* | 5/2017 | Perry | ............... | E03F 5/0404 |
| 2017/0361333 A1* | 12/2017 | Didden | ............... | C02F 1/285 |
| 2019/0257050 A1* | 8/2019 | Moon | ............... | E02B 15/0864 |
| 2019/0308119 A1* | 10/2019 | Norris | ............... | E02B 15/0814 |
| 2020/0207638 A1* | 7/2020 | Knorr | ............... | B01D 36/04 |
| 2020/0287206 A1* | 9/2020 | Jang | ............... | H01M 4/587 |

\* cited by examiner

SUBMERSIBLE SIEVE APPARATUS FOR MINERALS

FIELD OF THE INVENTION

The present invention relates to a placer prospecting apparatus for straining sediment from lotic channel systems. More specifically, the present invention relates to a submersible sieve apparatus provided with an exoskeletal frame enveloping a filter element and a detached post-filter backing; positioned to strain a lotic stream of entrained sediment prior to or upon being deposited.

BACKGROUND OF THE INVENTION

Placer prospecting requires disturbing the channel environment, including relocating bedrock, to mine sediment deposits.

Depending upon the application, prospecting sizes are varied in relation to cost. However, it would be desirable to provide a submersible sieve apparatus, which can be an inexpensive and environmentally conscious method of extracting sediment. It would also be desirable to provide a reusable and cleanable filter element.

It would also be desirable to provide an improved exoskeletal frame which can take and maintain shape of the natural contour of the lotic channel, under stress, and envelope both the detached post-filter backing and the main filter where detached post-filter backing is seated tightly on the main filter and, depending upon the application, separable from the main filter.

SUMMARY OF THE PRESENT INVENTION

The present invention relates to a new submersible sieve apparatus to be submerged into a channel of liquid, typically water, to be used as a, full gradient spectrum, lotic strainer to entrap entrained sediment comprising of an exoskeletal frame; a filter element of measurable non-zero partial impedance to liquid and having a plurality of passages therethrough, wherein the passages vary in size to provide an irregular surface, supported by the frame; and a detached post-filter backing adjacent the filter element, the detached post-filter backing having no passages therethrough. The detached post-filter backing is supported by the exoskeletal frame in a side-by-side relationship with the filter to entrap sediment which passes through the filter. In one embodiment, the detached post-filter backing may be made of Poly(methyl methacrylate).

The present invention further relates to a lotic channel sysem. The channel includes natural support within the path of lotic-flow through the lotic channel system. The sieve assembly includes an exoskeletal frame, a filter element supported by the frame, and a detached post-filter backing. The main filter is supported by the frame to strain the lotic which passes through the frame. In one embodiment, the sieve assembly is supported generally perpendicular to the lotic-flow direction; however, the sieve assembly could also be supported at an angle which is not perpendicular to the lotic flow direction.

The present invention further relates to a lotic channel sysem. The channel includes natural support within the path of lotic-flow through the lotic channel system. The sieve assembly includes an exoskeletal frame, a filter element supported by the frame, and a detached post-filter backing. The detached post-filter backing is supported by the exoskeletal frame in a side-by-side relationship with the filter to strain the lotic which passes through the filter. In one embodiment, the sieve assembly is supported generally perpendicular to the lotic-flow direction; however, the sieve assembly could also be supported at an angle which is not perpendicular to the lotic flow direction.

Figure 1:
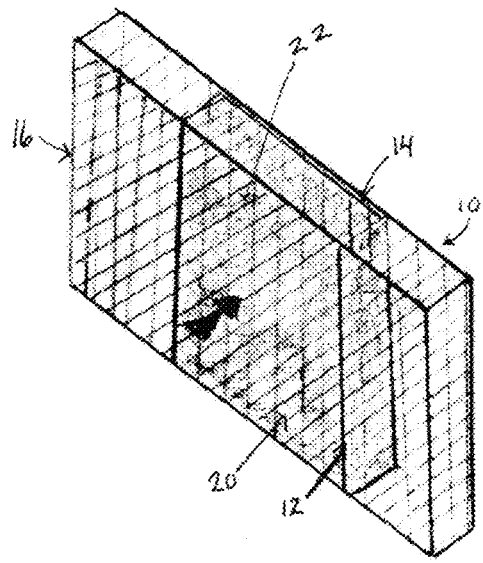
FIG. 1 is a perspective view of the front or inlet side of the preferred embodiment of a sieve appartus according to the present invention.
Figure 2:
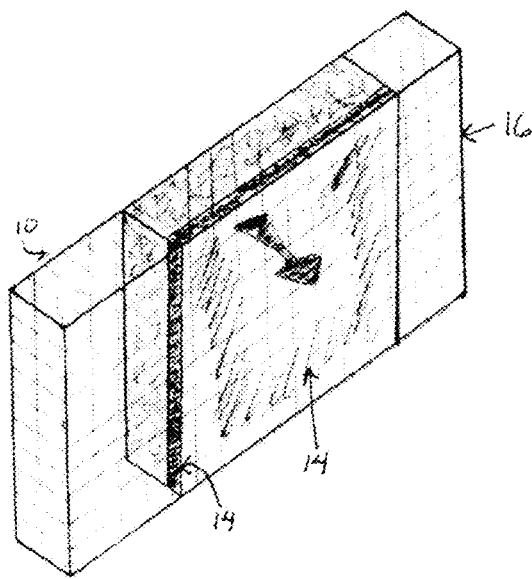
FIG. 2 is a perspective view of the back or outer side of the sieve apparatus.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 3:
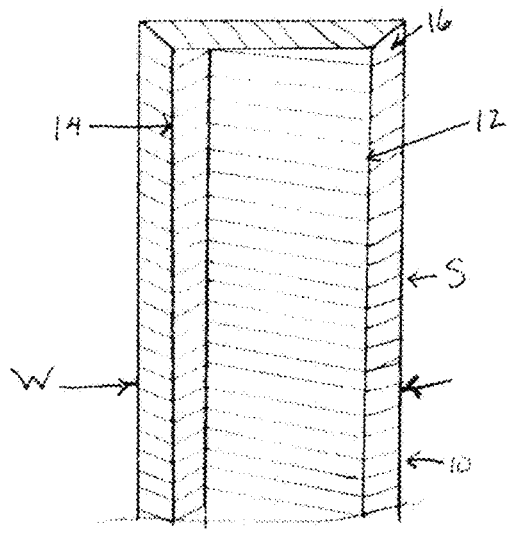
FIG. 3 is a cross section view of a portion of the sieve apparatus showing the relationship of the filter with a detached post-filter backing in the exoskeletal frame.
Figure 4:
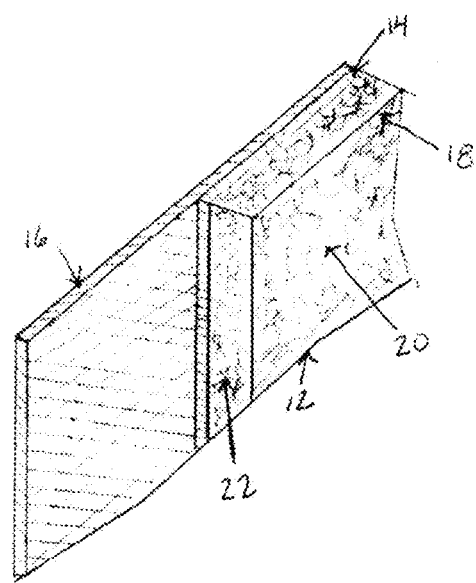
FIG. 4 is a perspective view showing the relationship of the detached post-filter backing to the filter to the exoskeletal frame.

Referring to the Figures, a sieve apparatus 10 according to the present invention generally includes a main filter element 12 and a detached post-filter backing 14 supported in a side-by-side relationship by a support structure such as an exoskeletal frame 16. As best illustrated in FIG. 3 the detached post-filer backing 14 is located downstream from the filter element 12.

In the preferred embodiment, filter element 12 is formed from an extruded mesh, arranged in a random pattern, vinyl filter material 18. Additionally, the fibers may be varied in diameter and spacing to provide an irregular surface and variable sizing of the passages through the mesh. The mesh thus has a plurality of openings 20 surrounded by an irregular surface 22 on the inlet side or outer surface of the filter 14. The irregular surface 22 disturbs stream, represented by S, and entangles entrained sediment which substantially prevents sediment from reaching detached post-filter backing 12. Thus, the filtering efficiency of filter 14 is increased. The filter element 12 is arranged so that one side substantially intersects a first plane defining an inner surface and the opposite side substantially intersect a second plane which defines an outer surface. By way of example, the filter material may be an extruded mesh including vinyl fibers such as that manufactured by American Floor Mats of Rockville, Md. referred to as a extruded vinyl. Furthermore, the density of the extruded mesh fibers can be varied to vary filter life and/or efficiency. In the preferred embodiment, the total area of filter material suitably conforms to the exoskeletal frame 16.

In the preferred embodiment, detached post-filter backing 14 is formed from a nitrile butadiene rubber mat backing material. In the preferred embodiment, the matting is formed as a solid, non-porous smooth surface. The detached post-filter backing 14 is arranged so that one side substantially intersects a first plane defining an inner surface and the opposite side substantially intersect a second plane which defines an outer surface. The non-porous smooth surface of detached post-filter backing 12 captures sediment that passes through filter 14. By way of example, the matting may be of the type manufactured by Preferred Compounding of Copley, Ohio. In the preferred embodiment, the total area of backing material suitably conforms along side filter 14 in exoskeletal frame 16.

In the preferred embodiment, exoskeletal frame 16 is formed from a polypropylene encased pliable metal mesh material. The material is fabricated in a box shape sized as required to fit in a placer mining conditions. The box may be cold formed, heat formed, glued, or welded at the corners to join the edges of the frame, leaving a hollow core.

Filter 12 and detached post-filter backing 14 are supported in the side-by-side, parallel relationship by frame 16. By way of example, filter 12 and detached post-filter backing 14 may be glued together at their perimeters of filter 14 creating a pocket between the inner surface of detached post-filter backing 14 and inner surface of filter 14.

In General, sieve apparatus 10 can be used in place of a conventional placer mining in a lotic channel. Referring to FIG. 3, sieve apparatus 10 is shown positioned in reference to a lotic channel. Exoskeletal frame 16 is perpendicular to the stream, represented by S, to filter entrained sediment from the stream.

Thus, it should be apparent that there has been provided in accordance with the present invention a submersible sieve apparatus that fully satisfies the objectives and advantages set forth above. Although the invention has been described in conjunction with specific embodiments thereof, it is evident that many alternatives, modifications and variations will be apparent to those skilled in the art. For example, the preferred width (W, FIG. 3) of sieve apparatus 10 is between 0.5 and 1.5 inches, but other widths could be used depending upon the application for the sieve. Accordingly, it is intended to embrace all such alternatives, modifications and variations that fall within the spirit and broad scope of the appended claims.

What is claimed is:

1. A new submersible sieve apparatus configured to be submerged into a channel of liquid, to be used as a, full gradient spectrum, lotic strainer to entrap entrained sediment, the sieve comprising:

an exoskeletal frame made from a pliable metal encased in a light weight polypropylene material that allows for the frame to take and maintain a shape for placement in the lotic channel under stress;

a filter element of measurable non-zero partial impedance to liquid and having a plurality of passages therethrough, wherein the passages vary in size to provide an irregular surface, supported and enveloped by the frame; and a detached post-filter backing adjacent the filter element, having no passages therethrough, supported and enveloped by the frame and adjacent filter element.

2. The submersible sieve apparatus of claim 1 wherein the exoskeletal frame is configured to be constructed as a rectangular shape and size not being larger than the lotic channel upon insertion into the lotic channel, the sieve thereby creating a plurality of evenly distributed openings, wherein apertures of the openings are configured to contain contents with non-zero impedance of the lotic channel therethrough.

3. The submersible sieve apparatus of claim 1 wherein the detached post-filter backing is constructed from a light weigh and non-porous material that is configured to allow the detached post-filter backing to conform to the shape of the lotic channel.

4. The submersible sieve apparatus of claim 1 wherein the filter element is constructed from a lightweight and pliable material, the filter element being configured to conform to the shape of the lotic channel.

5. The submersible sieve apparatus of claim 4 wherein the frame has a plurality of evenly distributed openings, wherein apertures of the openings are configured to be sufficiently wide to securely contain contents while maximizing lotic stream therethrough.

6. The submersible sieve apparatus of claim 1 wherein the filter element is configured to be proportional in size and shape to fit within said frame.

7. The submersible sieve apparatus of claim 2 wherein the detached post-filter backing is proportional and matching in size or shape to the filter element, wherein the filter resides in a side-by-side position with the detached post-filter backing.

* * * * *